(12) United States Patent
Ceotto et al.

(10) Patent No.: US 11,166,585 B2
(45) Date of Patent: Nov. 9, 2021

(54) AUTOMATIC COFFEE MACHINE FOR PREPARING ESPRESSO COFFEE

(71) Applicant: CMA MACCHINE PER CAFFE' S.R.L., Susegana (IT)

(72) Inventors: Beppino Ceotto, Susegana (IT); Giovanni Rossetto, Susegana (IT)

(73) Assignee: CMA MACCHINE PER CAFÉ S.R.L., Susegana (IT)

(*) Notice: Subject to any disclaimer, the term of this patent is extended or adjusted under 35 U.S.C. 154(b) by 513 days.

(21) Appl. No.: 15/559,477

(22) PCT Filed: Mar. 24, 2016

(86) PCT No.: PCT/IB2016/051689
§ 371 (c)(1),
(2) Date: Sep. 19, 2017

(87) PCT Pub. No.: WO2016/151531
PCT Pub. Date: Sep. 29, 2016

(65) Prior Publication Data
US 2018/0110361 A1    Apr. 26, 2018

(30) Foreign Application Priority Data

Mar. 25, 2015  (IT) .............................. MI2015A0436

(51) Int. Cl.
    *A47J 31/42*    (2006.01)
    *A47J 42/00*    (2006.01)
    *A47J 31/06*    (2006.01)
(52) U.S. Cl.
    CPC ........... *A47J 31/42* (2013.01); *A47J 31/0689* (2013.01)

(58) Field of Classification Search
    CPC .................................. A47J 31/42; A47J 42/50
    See application file for complete search history.

(56) References Cited

U.S. PATENT DOCUMENTS 4,971,259 A * 11/1990 Nidiffer ................... A47J 42/50
                                                      241/100
5,386,944 A *  2/1995 Knepler ................... A47J 42/38
                                                        241/6

(Continued)

FOREIGN PATENT DOCUMENTS

GN       104066364        9/2014
WO    WO-2014037495 A1 *  3/2014

OTHER PUBLICATIONS

International Search Report and written opinion of PCT/IB2016/051689 dated Sep. 1, 2016.

(Continued)

*Primary Examiner* — Robert J Utama
*Assistant Examiner* — Lawrence H Samuels

(57) ABSTRACT

The automatic coffee machine for preparing espresso coffee comprises at least one; infusion assembly (1) having an infusion piston (2) that can be actuated by motorized means (3), at least one container containing coffee beans to be ground, grinding means (4, 5) to grind the beans for preparing doses of ground coffee, conveying means to convey the doses of ground coffee into a filter-holder element (7) arranged under the piston, the grinding means (4, 5) comprising a first and a second grinder that are actuated by a first and a second opposite motor (8, 9) arranged laterally to the infusion piston.

6 Claims, 7 Drawing Sheets

(56) References Cited

U.S. PATENT DOCUMENTS

| | | | | |
|---|---|---|---|---|
| 5,458,295 | A * | 10/1995 | Haber | A47J 42/50 241/100 |
| 5,603,458 | A * | 2/1997 | Sandolo | A47F 1/02 241/100 |
| 7,350,455 | B2 * | 4/2008 | Vetterli | A47J 31/42 99/280 |
| 9,578,986 | B2 * | 2/2017 | Ceotto | A47J 31/42 |
| 10,314,426 | B2 * | 6/2019 | Hulett | A47J 31/40 |
| 2006/0201339 | A1 * | 9/2006 | Vetterli | A47J 31/42 99/452 |
| 2011/0198424 | A1 * | 8/2011 | Ford | A47J 31/42 241/30 |
| 2013/0133520 | A1 * | 5/2013 | Hulett | A47J 31/40 99/285 |
| 2013/0302481 | A1 * | 11/2013 | Dalla Corte | A47J 31/52 426/231 |
| 2014/0123857 | A1 * | 5/2014 | Rego | A47J 42/38 99/280 |
| 2014/0360379 | A1 * | 12/2014 | Radhakrishnan | A47J 31/3633 99/323 |
| 2014/0366743 | A1 * | 12/2014 | Radhakrishnan | A47J 31/42 99/286 |
| 2015/0013545 | A1 * | 1/2015 | Egli | A47J 31/401 99/286 |
| 2015/0250354 | A1 * | 9/2015 | Ceotto | A47J 31/42 99/281 |

OTHER PUBLICATIONS

Italian Search Report dated Oct. 23, 2015 for priority application No. MI2015A000436.
First Office Action issued by the CN Patent Office dated Apr. 29, 2019 with relevant letter of the CN agent and English summary.
Office Action issued by the Australian Patent Office dated Sep. 12, 2019 for corresponding patent application in Australia No. 2016238382.

* cited by examiner

AUTOMATIC COFFEE MACHINE FOR PREPARING ESPRESSO COFFEE

RELATED APPLICATIONS

This application is the US national phase application of international application PCT/IB2016/051689, filed 24 Mar. 2016, which designates the US and claims priority to Italian application MI2015A000436 filed 25 Mar. 2015, the contents of each of which are hereby incorporated by reference as if set forth in their entireties.

FIELD OF THE INVENTION

The invention concerns an automatic coffee machine for preparing espresso coffee.

KNOWN BACKGROUND ART

As known, automatic coffee machines having an infusion assembly incorporating a container of coffee beans that supplies a grinder which, in turn, supplies ground coffee to a filter-holder, are currently available.

Only one quality of coffee beans can be used with this type of machine which thereby allows for just one preset coffee blend to be made.

There are also automatic coffee machines having two infusion assemblies each provided with a grinder.

In this solution a grinder is provided per each infusion piston.

These machines having two infusion assemblies allow two different coffee blends to be made, one per each infusion assembly.

In view of what is mentioned above, the current automatic coffee machines do not allow each infusion group to be able to have multiple coffee blends available before making the desired espresso coffee.

The aim of the present invention is to overcome the drawbacks of the prior art highlighted above.

Within this aim, it is an object of the present invention to implement an automatic coffee machine which allows more coffee blends to be available per each infusion group.

It is also an object of the present invention to implement an automatic coffee machine that allows the grinder that supplies coffee powder to the filter-holder, to suffer less wear, thereby having less dead time for replacing the grinding elements which results in reduced downtimes.

It is a further object of the present invention to implement an automatic coffee machine which, in case of failure of the grinder, is still able to work with the other grinder.

It is also an object of the present invention to implement an automatic coffee machine which allows for simultaneously blending two desired blends of coffee powder.

It is also an object of the present invention to implement an automatic coffee machine which allows a grinder to be used to dispense a predetermined amount of a soluble substance in order to make, for example, a milky coffee or another desired beverage.

It is also an object of the present invention to implement an automatic coffee machine that allows for always maintaining the filter-holder inside the machine even when the coffee blend is changed before making the desired espresso coffee.

Last but not least, it is an object of the present invention to implement an automatic coffee machine that allows for changing not only the blend but also the grain size obtained by grinding the coffee beans, thereby ensuring a diversification of the used blend and thus a high flexibility in use.

SUMMARY OF THE INVENTION

This task as well as these and other objects are achieved by an automatic coffee machine for preparing espresso coffee, comprising at least one infusion assembly having an infusion piston that can be actuated by motorized means, at least one container containing coffee beans to be ground, grinding means to grind the beans so as to prepare the doses of ground coffee, conveying means to convey said doses of ground coffee into a filter-holder element arranged under said piston, characterized in that said grinding means comprise a first and a second grinder that are actuated by a first and a second opposite motor arranged laterally to said infusion piston.

According to a possible embodiment of the present invention, said first and second grinder are equidistantly connected to said conveying means.

The dependent claims better explain the inventive features according to the invention.

BRIEF DESCRIPTION OF THE DRAWINGS

Further characteristics and advantages of the invention will become more evident from the description of a preferred, but not exclusive, embodiment of the coffee machine according to the invention, depicted for illustrative purposes only and without limitation in the attached drawings, in which.

DETAILED DESCRIPTION OF EMBODIMENTS OF THE PRESENT INVENTION

Figure 1:
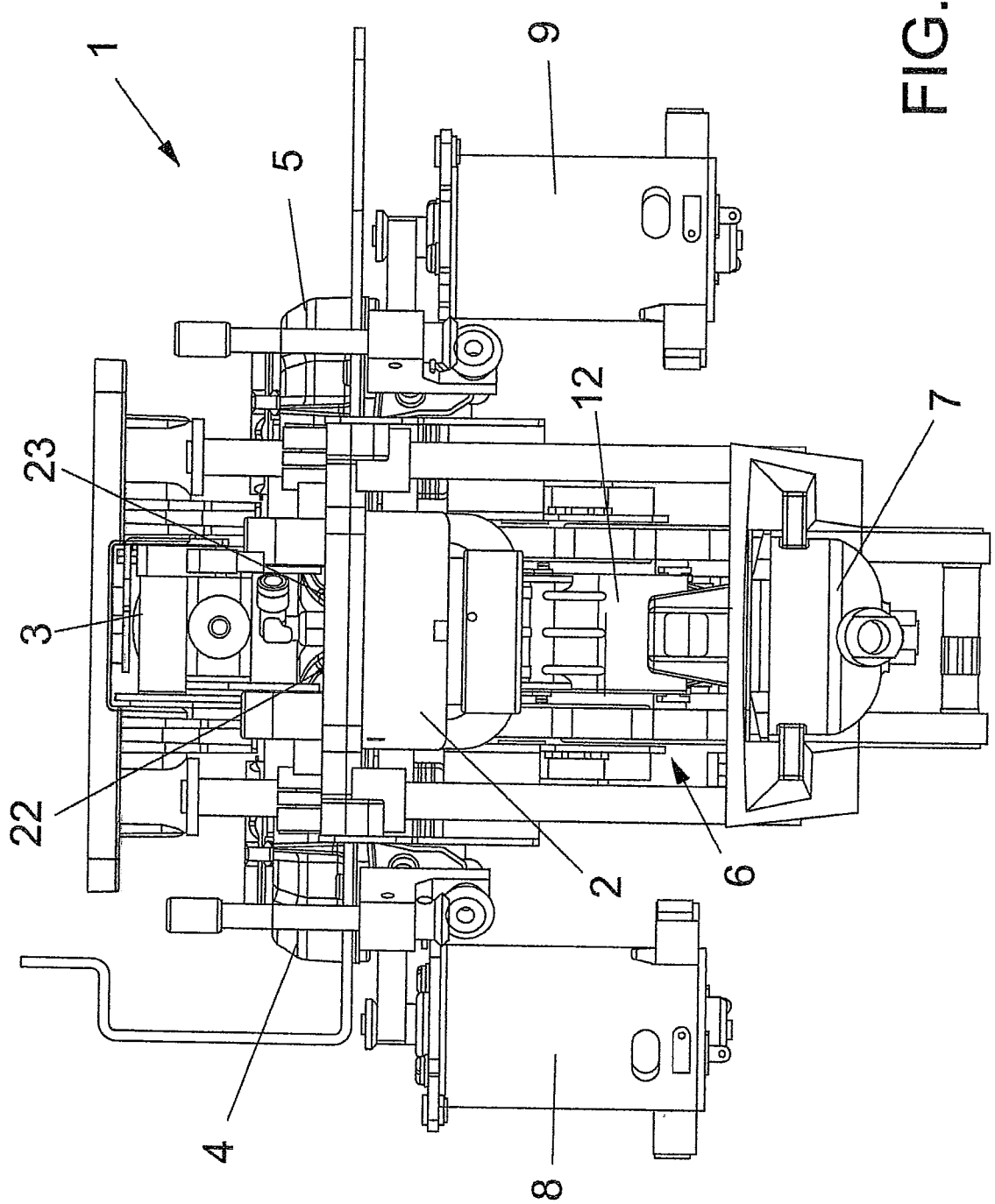
FIG. 1 shows a front partial view of the various components, and in particular of the two grinders, of the coffee machine having the infusion piston raised, according to the invention.
Figure 2:
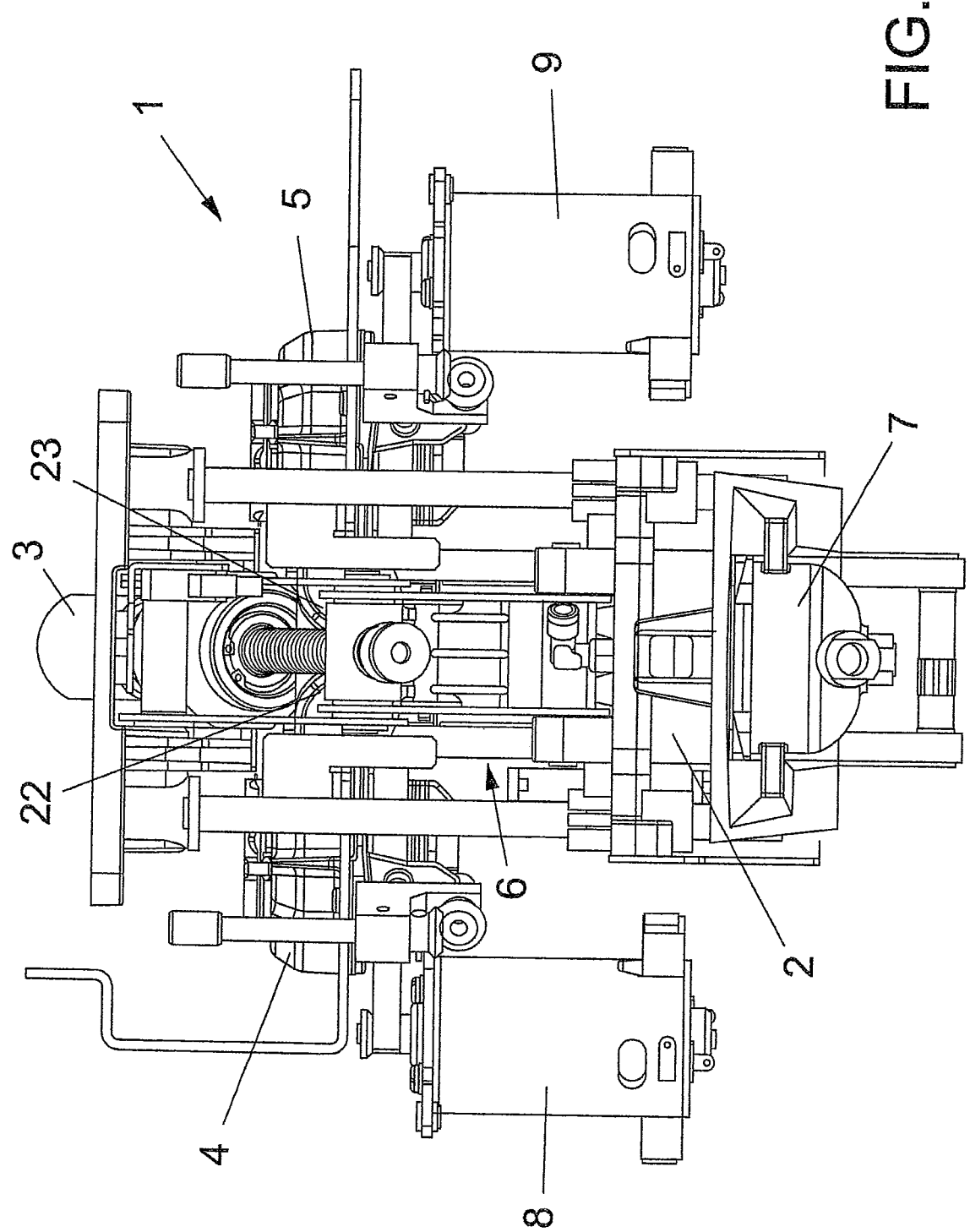
FIG. 2 shows the coffee machine of FIG. 1 with the infusion piston lowered according to the invention.
Figure 3:
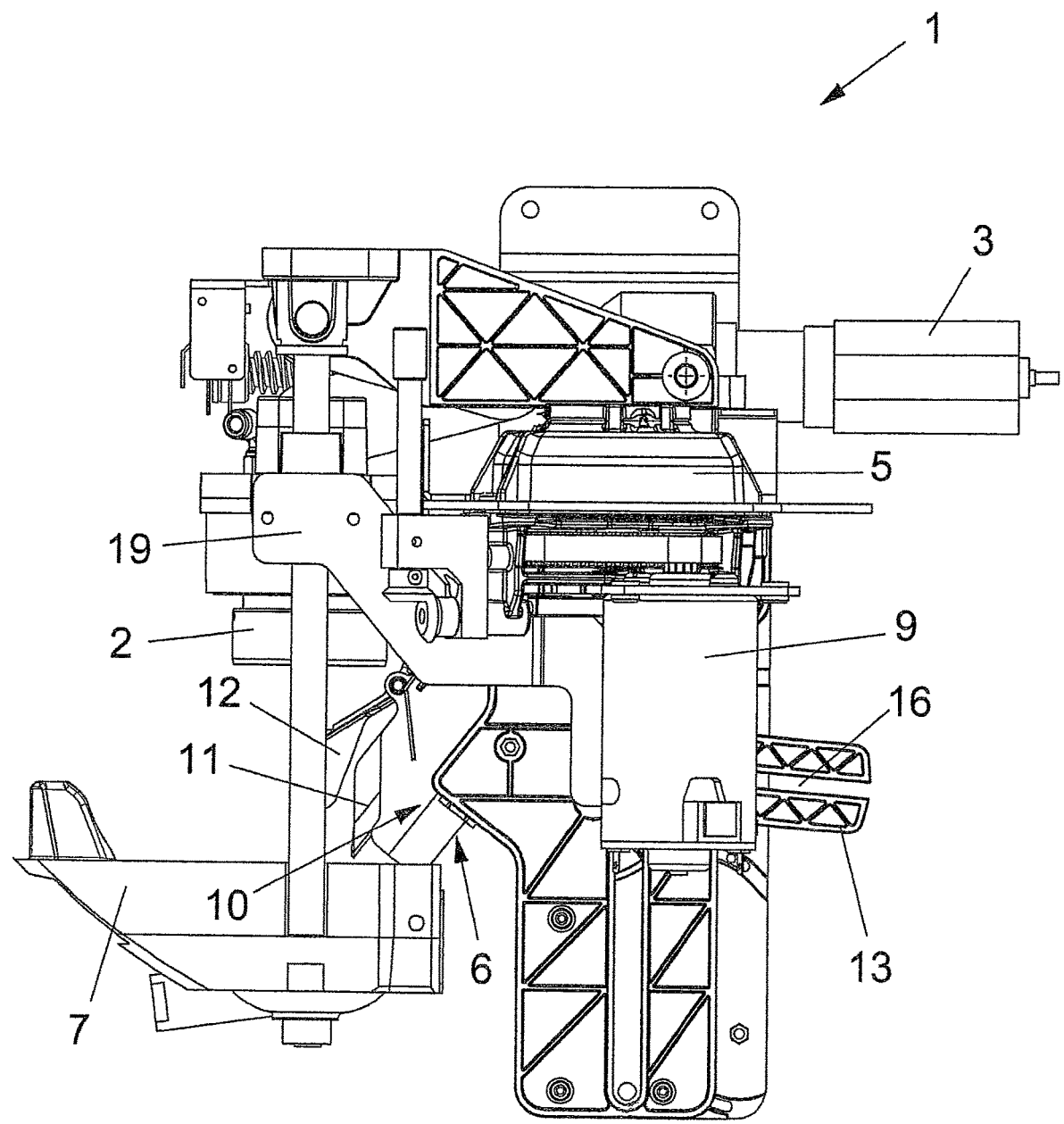
FIG. 3 is a side elevation view of the machine depicted in FIG. 1.
Figure 4:
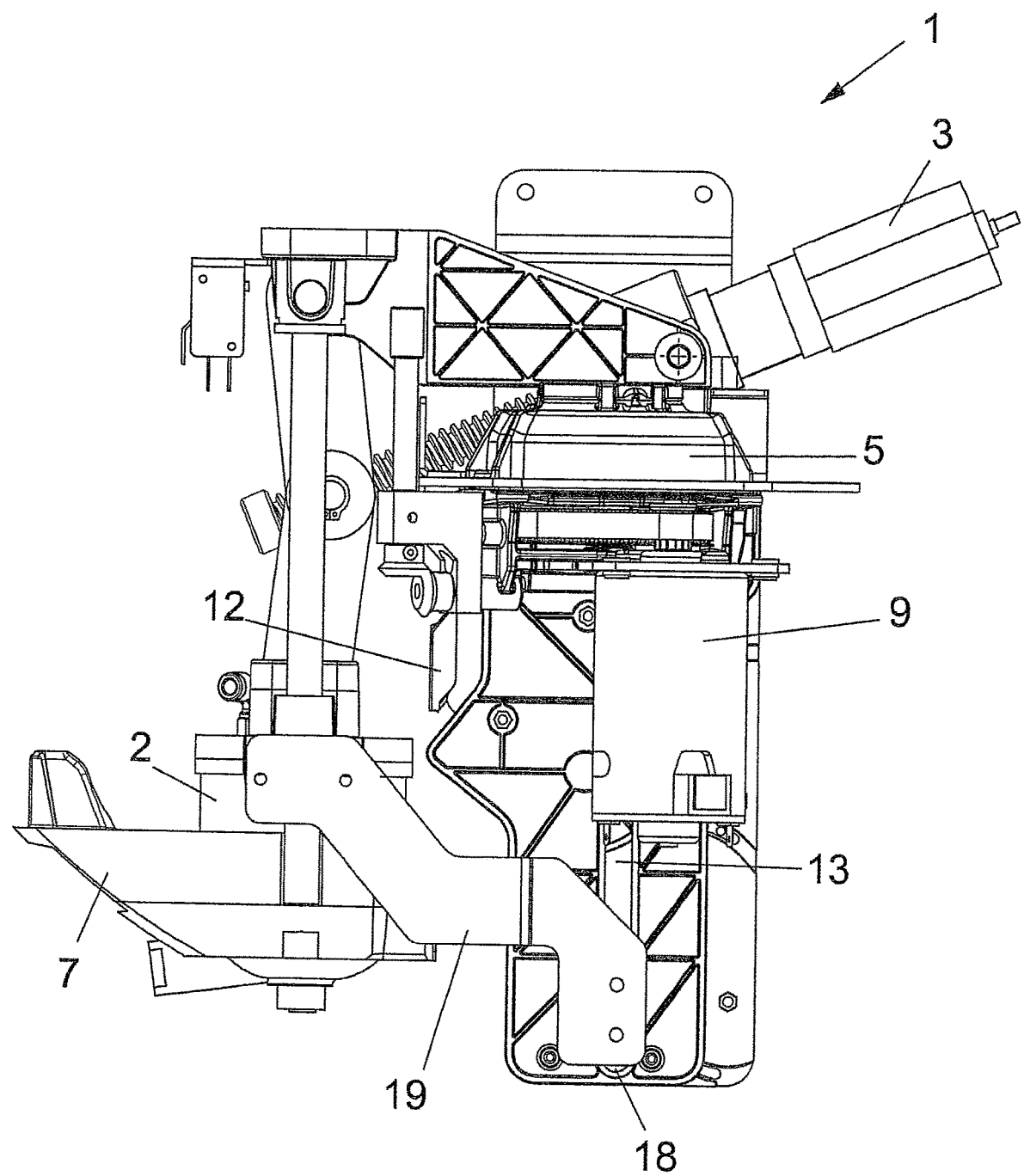
FIG. 4 is a side elevation view of the machine depicted in FIG. 2.
Figure 5:
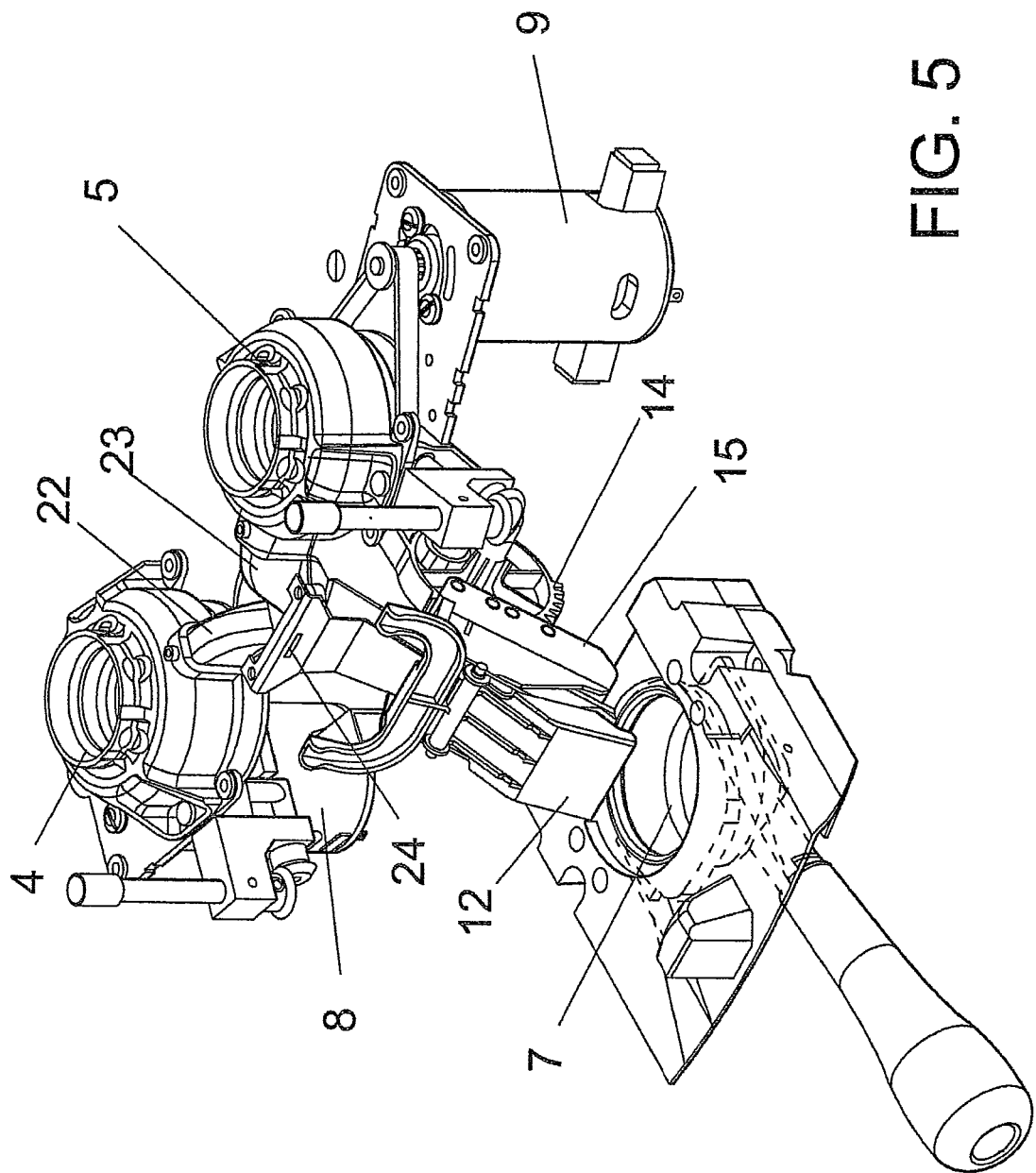
FIG. 5 is a perspective view of the machine depicted in FIGS. 1 and 3 according to the invention.
Figure 6:
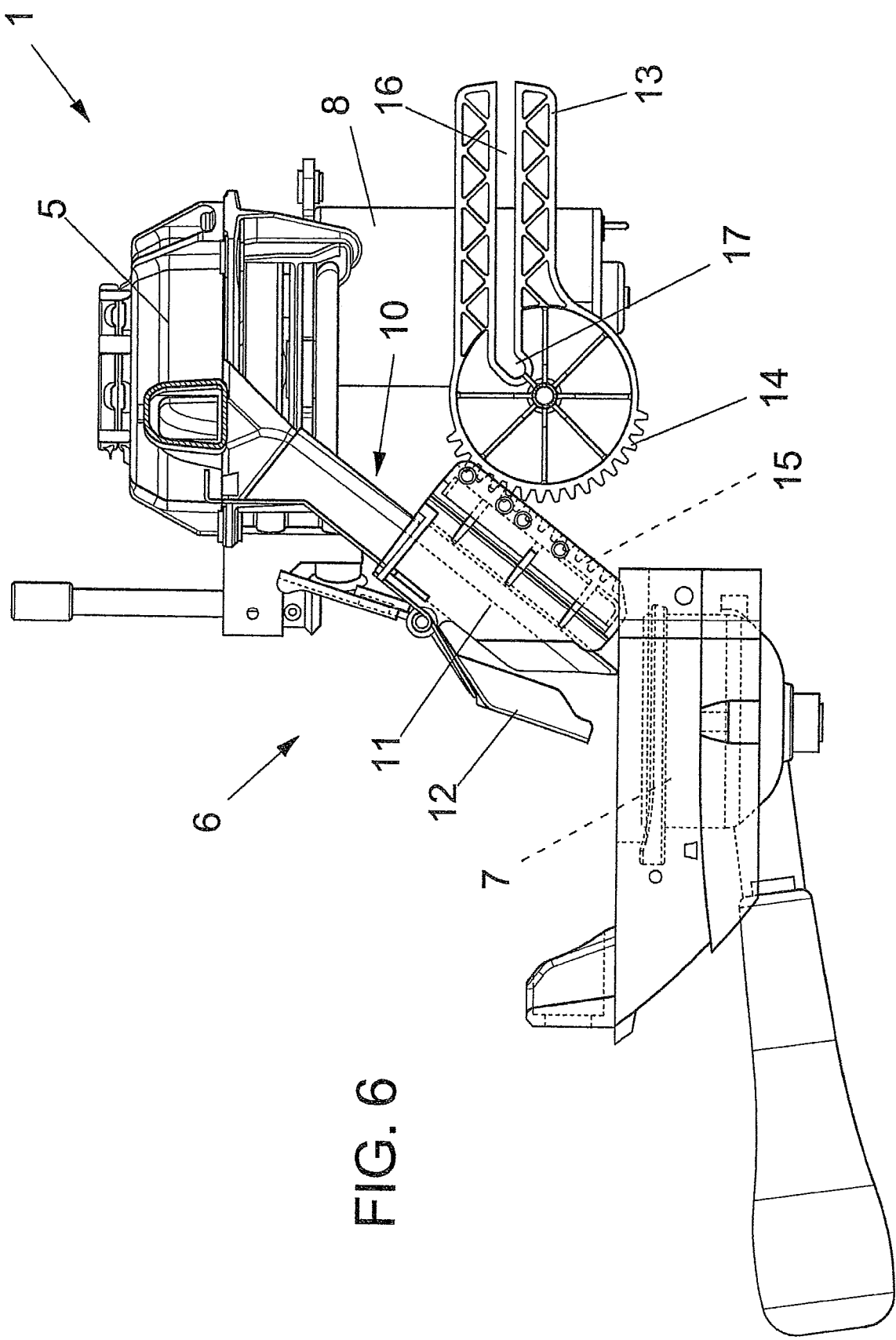
FIG. 6 and FIG. 7 schematically show the movement of the slotted device 12 and the movable end piece 11 according to the invention.
Figure 7:
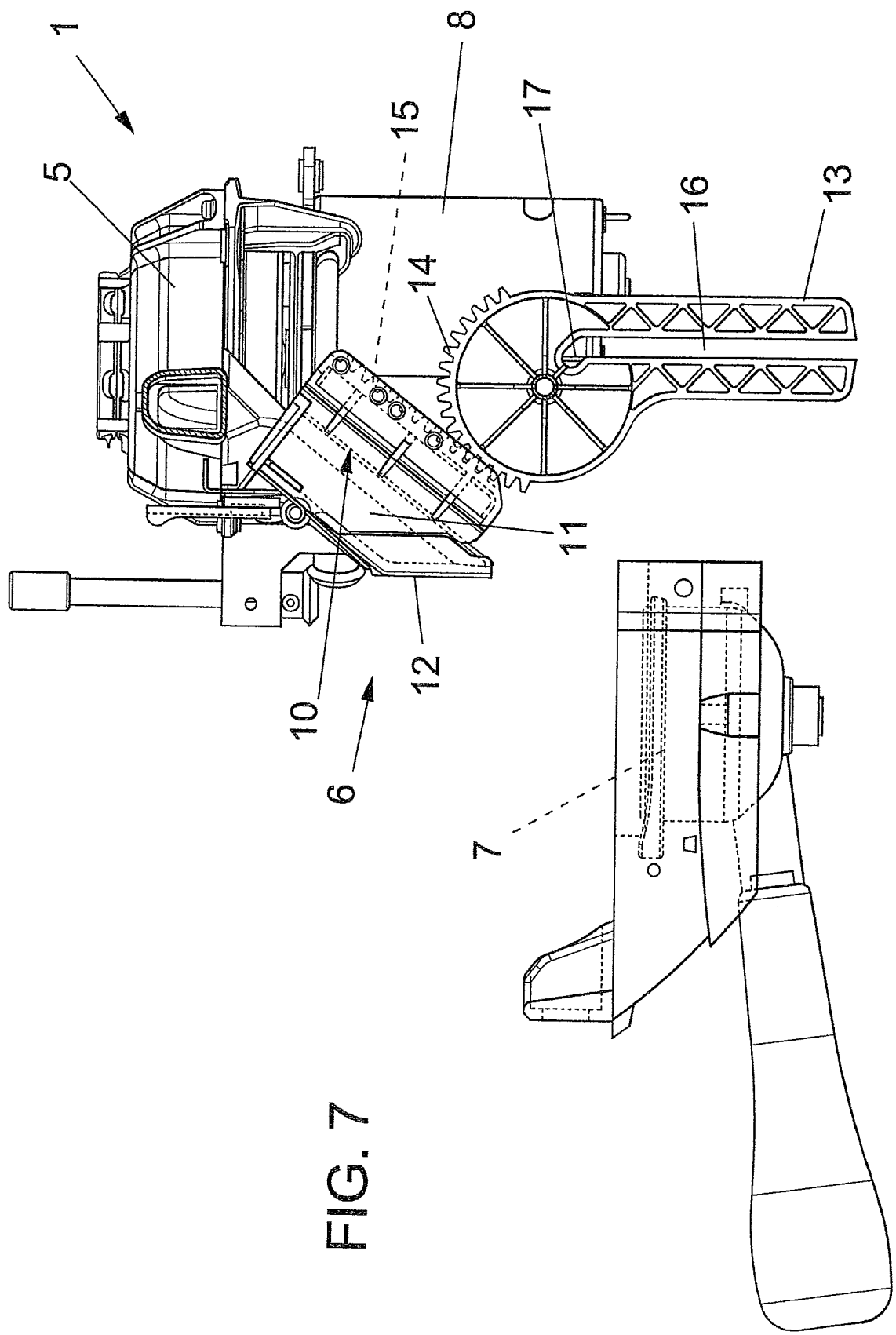

Referring particularly to the aforesaid figures, the automatic coffee machine according to the invention is able to continuously prepare espresso coffees, having the ability to select at will the coffee blend before making the desired espresso coffee.

In particular, the coffee machine comprises at least one infusion assembly depicted as a whole by numeral 1, having an infusion piston 2 that can be actuated by motorized means and, in particular, by an electric motor 3.

The machine further has a first and a second container for coffee beans to be ground, not shown, that respectively supply the beans to the grinding means defined by a first and a second grinder 4 and 5, in order to prepare the doses of ground coffee.

The doses of ground coffee are then moved by conveying means, generally referred to with the numeral 6, inside a filter-holder element 7 arranged under the infusion piston 2.

Advantageously, the first and second grinders 4 and 5 are actuated by a first and a second motor 8 and 9 laterally arranged on the opposite sides of the infusion piston 2 in a backward region with respect to the same and the filter-holder 7, so that the resulting assembly is extremely compact and there is no interference with the front part of the machine where the filter-holder is manipulated and the espresso coffee is dispensed.

The first and second grinders 4 and 5 are equidistantly connected to conveying means 6 to convey the coffee powder through a first and a second curved channel 22 and 23 so that the path of the powder is equal for both grinders from their discharge outlet to the filter-holder.

In this manner, the grinding times can be calculated for both grinders according to requirements, without the filling of the filter-holder being affected by the grain size of the obtained coffee powder, which can be either equal or different for the two grinders.

Conveniently, the first grinder is supplied by a first container of a first blend of coffee beans and the second grinder is supplied by a second container of a second blend of coffee beans in order to ensure that the user has the possibility to choose between two blends of coffee powder which differ from each other both for taste and for grain size.

For example, one of the advantages given by the invention, in addition to the availability of two different blends of coffee powder per each infusion piston, is to allow the second container to contain, instead of the coffee powder, a soluble product or a similar product able to be used either individually to make a desired beverage or together with the coffee powder of the other grinder to make a milky coffee or a coffee combined with other essences.

In the case of soluble powder, the designated grinder simply acts as dispenser of the coffee powder within the conveying means.

The first and the second grinders can be activated either selectively or simultaneously.

In the last case, by blending different amounts of coffee powder with a different grain size and without modifying the grinders in any way, it is possible to obtain an infinite number of variations in the grain size as well as in the blend thereby attaining the organoleptic perfection of the dispensed espresso coffee.

In fact, it is possible to have not only different blends and blends with different degrees of grain size but also a different impact as the infusion water passes through the powder in the filter-holder, due to possibility of delivering in the latter a first amount of coffee powder with fine grain size and then delivering in the same a second amount of coffee powder with coarse grain size and vice versa.

In other words, various layers of coffee powder with different grain sizes can be produced in the filter-holder.

Thanks to this flexibility in use, it is possible to have a machine able to dispense endless types of espresso coffee.

In particular, the conveying means 6 to convey ground coffee comprise a telescopic conveyor 10 with a movable end piece 11 that can also be actuated by the electric motor 3.

The outlets of the first and the second curved channels 22 and 23 open into a hopper 24 positioned on the top of the telescopic conveyor, in order to take the coffee powder into the filter-holder 7.

In a predetermined way and by synchronizing means, the motor 3 manages the movement of the movable end piece 11 of the telescopic conveyor with the infusion piston and the first and second grinders.

In particular, the synchronizing means comprise a slotted control device 13 for controlling a kinematic mechanism for activating the movable end piece 11 having at one end thereof a flap 12 which is opened or closed by means for converting the translational movement of the movable end piece 11 into a rotation of the flap 12.

In more detail, the slotted device 13 has a toothed head 14 that meshes with teeth 15 on the bottom of the movable end piece 11.

Advantageously, the slotted device 13 has a slot 16 ending with a tilted seat 17 inside of which a slidable pin 18 is moved vertically by a bracket 19 connected to the infusion piston 2.

As a result, when the machine is activated for producing a coffee beverage, the blend is able to be selected by activating, respectively, one grinder or the other or even both the grinders, the movable end piece 11 located close to the filter-holder 7 and which begins to become filled with the predetermined amount of coffee powder.

The flap 12 is in the open position and the bracket 19 with the pin 18 is in the raised position.

The pin 18 is housed inside the tilted seat 17 and the slotted element is in a substantially horizontal position.

When the infusion piston 2 starts to descend, at the same time the bracket 19 descends, thereby directing the pin 18 inside the slot 16 so as to cause the rotation of the slotted device 13 that returns the end piece 11 to the retracted position, by means of the toothed head 14.

While the end piece 11 is rising, the flap 12 automatically closes.

After the coffee has been dispensed, as the piston 2 rises it causes the end piece 11 to return to the loading position of the filter-holder, repeating the above described sequential steps.

Any modifications and variations, besides the already mentioned ones, are of course possible, in particular those relating to materials, dimensions and proportions of the elements illustrated in figures.

The so-designed automatic machine for preparing espresso coffees is susceptible of several modifications and variations, all falling within the inventive conception; furthermore, all the details can be replaced by technically equivalent elements.

In practice, any materials or sizes can be used according to the requirements and the state of the art.

The invention claimed is:

1. Automatic coffee machine for preparing espresso coffee, comprising at least one infusion assembly having an infusion piston that is suitable to be actuated by motorized member, at least one container coffee beans to be ground, grinding means for grinding the beans so as to prepare the doses of ground coffee, conveying means for conveying said doses of ground coffee into a filter-holder element arranged under said piston, wherein said grinding means comprise a first and a second grinder that are actuated by a first and a second opposite motor arranged laterally to said infusion piston in a backward region with respect to the infusion piston and the filter-holder wherein said conveying means comprises a telescopic conveyor with a movable end piece, said automatic coffee machine further comprising a slotted control device for activating said movable end piece, said slotted control device having a toothed head that meshes with teeth being on a bottom of said movable end piece.

2. Automatic coffee machine according to claim 1, wherein said movable end piece of said telescopic conveyor comprises a flap at one end thereof.

3. Automatic coffee machine according to claim 1, wherein said slotted control device has a slot ending with a tilted seat inside of which a slidable pin is moved vertically by a bracket connected to said infusion piston.

4. Automatic coffee machine according to claim 1, wherein said first grinder is supplied by a first container containing a first blend of coffee beans and that said second grinder is supplied by a second container containing a second blend of coffee beans.

5. Automatic coffee machine according to claim 4, wherein said second container is adapted to contain the same blend of coffee beans of the first container, or a different blend.

6. Automatic coffee machine according to claim 1, wherein said first and second grinder are activated selectively or simultaneously.

\* \* \* \* \*